(12) United States Patent
Blodgett

(10) Patent No.: US 6,483,378 B2
(45) Date of Patent: *Nov. 19, 2002

(54) VOLTAGE PUMP WITH DIODE FOR PRE-CHARGE

(75) Inventor: Greg A. Blodgett, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/956,812

(22) Filed: Sep. 21, 2001

(65) Prior Publication Data

US 2002/0008569 A1 Jan. 24, 2002

Related U.S. Application Data

(63) Continuation of application No. 09/611,769, filed on Jul. 6, 2000, now Pat. No. 6,294,948.

(51) Int. Cl.[7] .............................. G05F 1/10; G05F 3/02
(52) U.S. Cl. ....................................................... 327/536
(58) Field of Search .................................. 327/536, 537, 327/589

(56) References Cited

U.S. PATENT DOCUMENTS

| 5,140,182 | A | | 8/1992 | Ichimura |
| 5,677,645 | A | | 10/1997 | Merritt |
| 5,828,095 | A | | 10/1998 | Merritt |
| 6,285,243 | B1 | * | 9/2001 | Mecier et al. ............... 327/536 |
| 6,288,601 | B1 | * | 9/2001 | Tomishima .................. 327/536 |

* cited by examiner

Primary Examiner—Timothy P. Callahan
Assistant Examiner—Quan Tra
(74) Attorney, Agent, or Firm—Dickstein Shapiro Morin & Oshinsky LLP

(57) ABSTRACT

A charge pump system for providing a voltage to a semiconductor device is disclosed. Current charge pumps use a separate pre-charge capacitor and pre-charge circuitry for the boot circuit which provides the gate voltage for the output transistor. The present invention eliminates the need for the separate pre-charge capacitor and pre-charge circuitry by the use of a single diode. The net effect is a more efficient and smaller charge pump circuit.

22 Claims, 9 Drawing Sheets

| FIG. 2(a) |
| FIG. 2(b) |

VOLTAGE PUMP WITH DIODE FOR PRE-CHARGE

This application is a continuation of application Ser. No. 09/611,769, filed Jul. 6, 2000, now U.S. Pat. No. 6,294,948, the subject matter of which is incorporated by reference herein.

BACKGROUND OF THE INVENTION

I. Field of the Invention

The present invention relates to semiconductor circuits and to charge pumps used therein. More specifically, the invention relates to a simplified charge pump system for providing a voltage to various semiconductor integrated circuits or portions thereof. The invention is particularly applicable to dynamic random access memory devices (DRAMs).

II. Description of the Related Art

System designs are routinely constrained by a limited number of readily available power supply voltages (Vcc). For example, consider a portable computer system powered by a conventional battery having a limited power supply voltage. For proper operation, different components of the system, such as display, processor, and memory components employ diverse technologies which require power to be supplied at various operating voltages. Components often require operating voltages of a greater magnitude than the power supply voltage and, in other cases, a voltage of reverse polarity. The design of a system, therefore, must include power conversion circuitry to efficiently develop the required operating voltages.

One such power conversion circuit is known as a charge pump. The demand for highly-efficient and reliable charge pump circuits has increased with the increasing number of applications utilizing battery powered systems, such as notebook computers, portable telephones, security devices, battery-backed data storage devices, remote controls, instrumentation, and patient monitors, to name a few.

Inefficiencies in conventional charge pumps have led to reduced system capability and lower system performance in both battery and non-battery operated systems. Inefficiency can adversely affect system capabilities, e.g., limited battery life, excess heat generation, and high operating costs. Examples of lower system performance include low speed operation, excessive operating delays, loss of data, limited communication range, and inability to operate over wide variations in ambient conditions including ambient light level and temperature.

In addition to constraints on the number of power supply voltages available for system design, there is an increasing demand for reducing magnitudes of the power supply voltages. The demand in diverse application areas could be met with highly efficient charge pumps that operate from a supply voltage of less than five volts.

Such applications include memory systems backed by 3 volt standby supplies, processor and other integrated circuits that require either reverse polarity substrate biasing or booted voltages outside the range of 0–3 volts for improved operation.

One such known charge pump system is a two stage charge pump. Two stage charge pump systems have proven to be effective at providing semiconductor components with the necessary input voltage particularly where the system voltage is below 3 volts.

For purpose of simplification, the following discussion will focus on the charge pumps which must produce a positive voltage greater than the most positive supply voltage Vcc; however, the concepts discussed are also applicable to charge pumps designed to produce a negative voltage from a positive Vcc voltage.

Most charge pumps comprise some variation of the basic charge pump 10 shown in the schematic diagram of FIG. 1. The basic charge pump 10 configuration includes a ring oscillator 12 which provides a square wave or pulse train having voltage swings typically between ground and the most positive external power supply voltage, Vcc. An inverter 14, buffer amplifier, or Schmnitt trigger circuit may be used to sharpen the edges of the oscillating output signal of the ring oscillator 12. When the ring oscillator 12 produces a voltage close to ground, the input to a capacitor 16 from inverter 14 is low. When the input to capacitor 16 is low, node 22 passes a charge of Vcc through diode 18 to node 26. At node 26 the received charge is approximately Vcc minus a threshold voltage, i.e. Vcc–Vt (where "Vt" is the threshold voltage). Since the input to capacitor 16 is low, capacitor 16 is pre-charged to the voltage Vcc–Vt at node 26.

When the ring oscillator 12 produces a voltage close to Vcc, the input to capacitor 16 from inverter 14 is high. During this period, Vcc is supplied to the capacitor 16 and, together with the pre-charged value of Vcc–Vt, passes a charge 2 Vcc–2 Vt to the load voltage terminal 24, Vccp. The additional Vt voltage drop is caused by diode 20. Vccp is the output voltage of charge pump 10. Capacitor 16 is prevented from discharging to node 22 by diode 18. Given an input voltage of Vcc, Vccp will typically result in twice the voltage of Vcc, minus the threshold voltages, 2 Vt.

In the charge pump 10, one pulse of current is delivered to the load voltage terminal 24 for every clock cycle of the ring oscillator 12, during the half of the clock cycle when the output of ring oscillator 12 is high. When the output of ring oscillator 12 is low, the other half of the clock cycle, capacitor 16 is pre-charged and voltage is not delivered to the load voltage terminal 24. These half clock cycles are commonly referred to as phases. Therefore, the charge pump 10 delivers a load voltage during a first phase and pre-charges capacitor 16 during a second phase. Although this second phase is necessary to pre-charge the capacitor 16, since no current is delivered to the load voltage terminal 24 during this second phase, it may be difficult to attain and maintain a final desired voltage, Vccp. Accordingly, charge pumps 10 have typically included two FIG. 1 circuits to operate out of phase with their outputs commonly connected to produce the load voltage at terminal 24 for each cycle of the ring oscillator 12 by utilizing both states of each ring oscillator cycle. This is known in the art as a two phase pump.

In most integrated electronic circuits, including memory chips, it is desirable that the final pump voltage at the load be reached as quickly as possible. Proper device functions and attributes, such as the integrity of stored data, cannot be guaranteed until the pump voltage has reached the proper value. However, the circuitry presently used for such a system is often inefficient in terms of size, power consumption and number of components. Therefore, there exist a need for a more efficient charge pump system.

SUMMARY OF THE INVENTION

The present invention relates to an improved charge pump system. Current charge pump systems contain a first boot circuit to provide a pump voltage Vccp as an output through an output transistor. Typically, such systems also contain a second boot circuit to provide a voltage greater than the pump voltage Vccp for driving the gate of the output transistor, to ensure that the pump voltage Vccp produced by the first boot circuit is passed to the drain of the output transistor and provided as output voltage Vccp. The present invention eliminates the need for the separate pre-charge capacitor and associated pre-charge circuitry found in current systems to pre-charge the capacitor of the second boot circuit, through the use of a single strategically placed diode. The net effect is a more efficient and smaller charge pump circuit.

BRIEF DESCRIPTION OF THE DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

Figures 2, 2A:
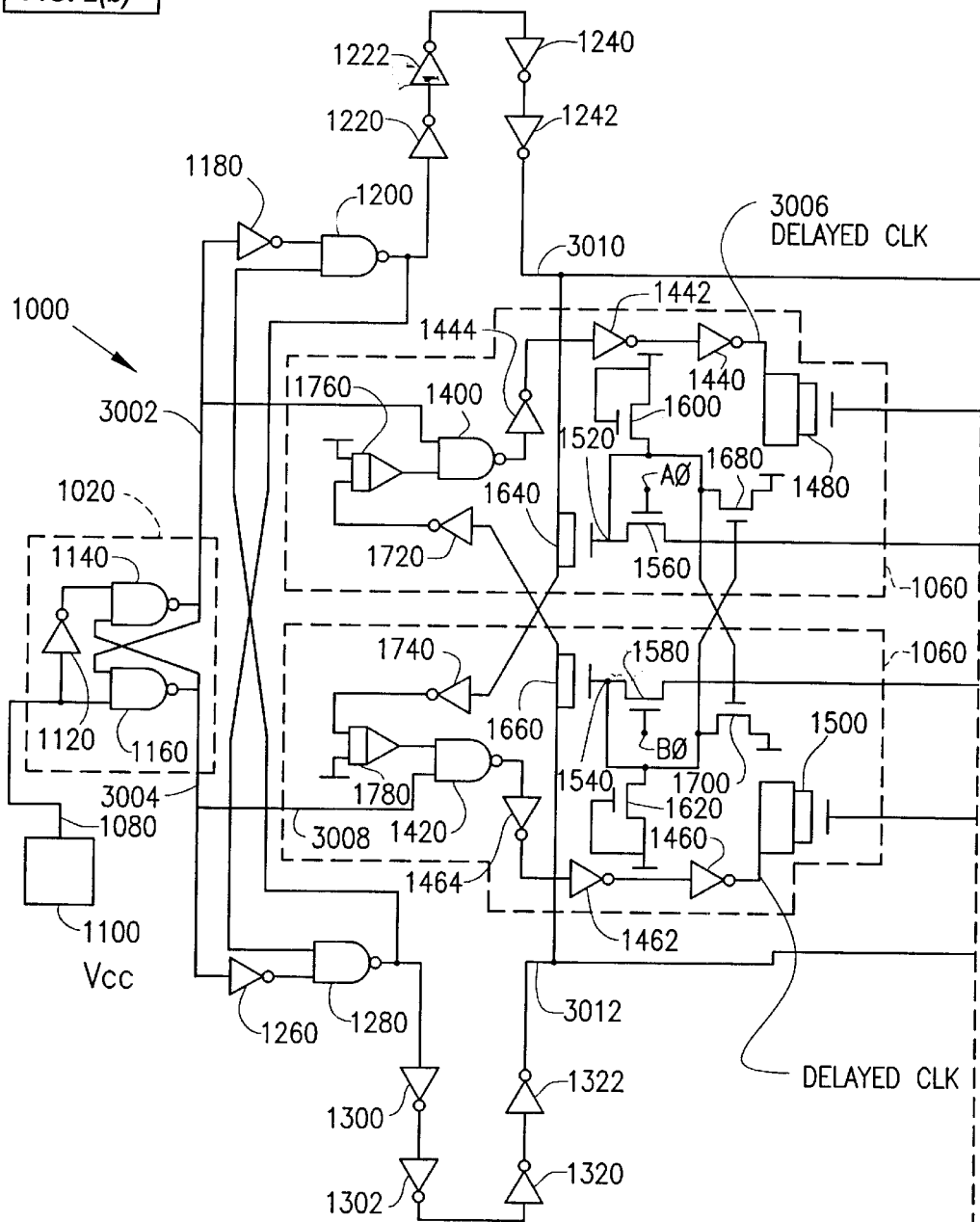
FIG. 2 is an illustration of a known two phase charge pump system.
Figure 2B:
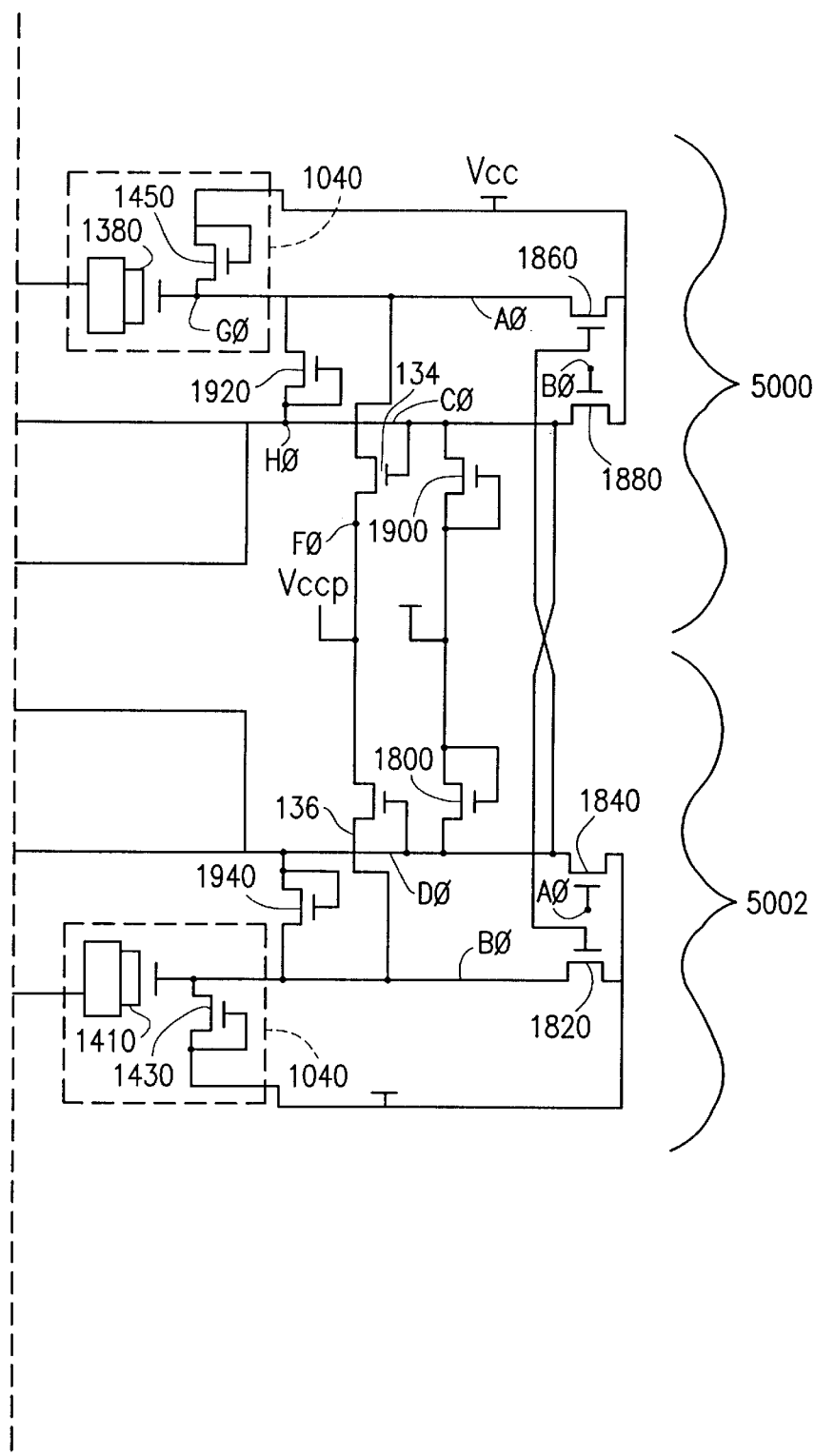

Understanding a conventional charge pump, depicted in FIG. 2, is necessary to fully comprehend the present invention, as the present invention improves upon the circuit of FIG. 2. FIG. 2 illustrates a two phase charge pump system 1000 which supplies a pump voltage Vccp at an out terminal. The charge pump system 1000 includes a two phase clock generator 1020; two first boot circuits 1040, each of which supplies a charge pump voltage Vccp during a respective one of the two operational phases; two second boot circuits 1060, each of which supplies a gate operating voltage to a respective output transistor 134, 136 to gate the output of the first boot circuit 1040 to a Vccp output terminal, and additional circuitry.

The two phase clock generator 1020 receives an oscillating signal from oscillator 1100 and produces two logical phase signals 3002, 3004 therefrom. The charge pump system 1000 is designed symmetrically, such that, one half of the pump circuit (top half) 5000 provides a pump voltage during one phase of the clock cycle and the second half of the pump circuit (bottom half) 5002 provides a pump voltage during a second phase of the clock cycle.

The two phase clock generator 1020 has an input 1080 for receiving an oscillating signal (Vcc) produced by oscillator 1100. NAND gates 1140 and 1160, formed as a flip flop, use inverter 1120 and the oscillator input to latch and produce outputs of opposite states. When the input 1080 to the two phase clock generator 1020 is high, the output of NAND gate 1140 is also high while the output of NAND gate 1160 is low. Likewise, when the input 1080 low, the output of NAND gate 1140 is low while the output of NAND gate 1160 is high.

Taking the top portion of the circuit 5000, which provides a pump voltage during a first phase, as an example, clock signal 3002 of the two phase clock generator 1020 is connected to the first boot circuit 1040 and the second boot circuit 1060. The first boot circuit 1040 operates similar to charge pump system 10 of FIG. 1. The first boot circuit 1040 receives clock signal 3002, as clock signal 3010, after having passed through one or more inverters 1180, 1220–1242 and a NAND gate 1200. The inverters 1180, 1220–1242 and a NAND gate 1200 are used for cross coupling of the top and bottom circuit portions 5000, 5002, to ensure that the rising and falling edges of clock signals 3002 and 3004 from two phase clock generator 1020 are properly aligned for each phase. Signal skew between clock signals 3002 and 3004 could result in a loss of is efficiency of the charge pump. Similar to charge pump system 10 of FIG. 1, when the clock signal 3010 to capacitor 1380 is low, capacitor 1380 is pre-charged with source voltage Vcc minus a threshold voltage (Vcc−Vt) from node GØ, where GØ received its initial charge from Vcc at node VØ passed through diode 1450. After the charge pump system 1000 has been operating past the initial clock cycles, transistor 1860 supplies GØ with the pre-charge voltage, as the gate of transistor 1860 is driven to a level above Vcc+Vt when clock signal 3010 is low because the gate of transistor 1860 is cross coupled to the bottom portion of the circuit. The boosted gate level on transistor 1860 allows GØ to be precharged to a full Vcc level. When clock signal 3010 to capacitor 1380 goes high, similar to capacitor 16 of FIG. 1, Vcc is supplied from clock signal 3010 to capacitor 1380 and together with the pre-charged value (Vcc) passes a final charge of 2 Vcc to node GØ. This function is typically referred to as booting or pumping the voltage. Capacitor 1380 is prevented from discharging to Vcc by diode 1450. This final voltage of 2 Vcc at node GØ is then passed to the source of output transistor 134.

Figure 1:
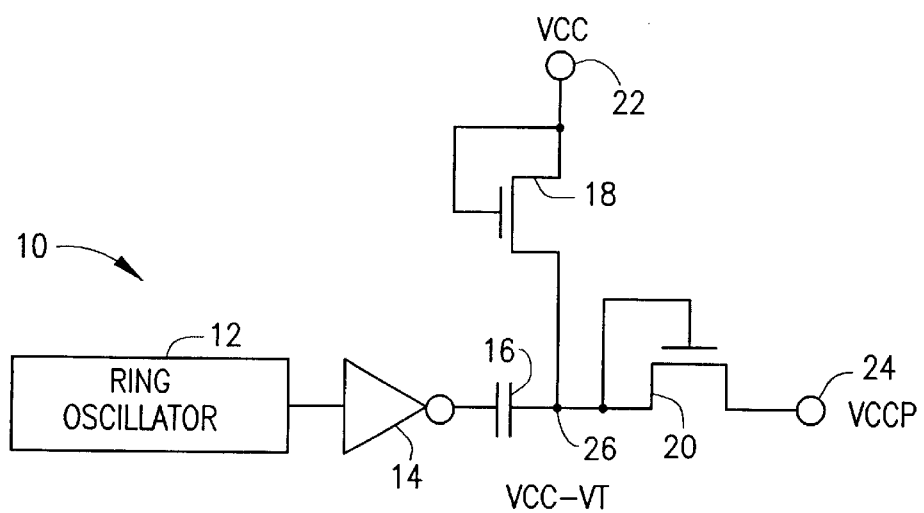
FIG. 1 is an illustration of a conventional charge pump.

The second boot circuit 1060 is provided with a clock signal, which is delayed by delay element 1760. Second boot circuit 1060 provides the gate voltage for output transistor 134. This gate voltage must be higher than the voltage 2 Vcc at node GØ in order to properly drive the gate of transistor 134, such that the final voltage at node GØ will be most efficiently passed to the drain of transistor 134 which results in Vccp. To achieve this higher output from the second boot circuit 1060, capacitor 1480 of the second boot circuit 1060, similar to the charge pump system 10 of FIG. 1, is first pre-charged to Vcc through transistor 1880, then is further precharged to 2 Vcc−Vt through transistor 1560 by capacitor 1640. The second boot circuit 1060 then adds another Vcc voltage produced by the delayed clock signal at 3006, to this pre-charge voltage to produce a voltage of 3 Vcc−1 Vt at node HØ for driving the gate of transistor 134. Thus, the output of the second boot circuit 1060 will be greater than 2 Vcc in order to properly drive the gate of output transistor 134. Since the gate voltage of 134 only needs to be 1 Vt above HØ, diode 1920 is advantageously used to route excess charge from HØ to GØ and through transistor 134 to Vccp. The Vt of diode 1920 should be at least as high as the Vt of transistor 134 (a little higher is better).

In operation, capacitor 1480 is pre-charged through node HØ by the pre-charge circuitry which contains pre-charge capacitor 1640; pre-charge transistors 1560 1680; and pre-charge diode 1600. With this pre-charge circuitry, node HØ is provided with an initial voltage greater than Vcc, preferably 2 Vcc−1 Vt, which is produced by the pre-charge voltage of Vcc supplied from Vcc at node 1520 through transistor 1680 which is booted to 2 Vcc when the clock signal at the input to capacitor 1640 goes high. This voltage, now 2 Vcc passes through transistor 1560 which has a Vt voltage drop, providing a voltage of 2 Vcc−1 Vt as a pre-charge voltage at node HØ. In other words, a voltage of 2 Vcc−1 Vt is provided to pre-charge node HØ. Thus, when the delayed clock signal 3006 (Vcc) is presented at the input of pre-charge capacitor 1480 a charge greater than 2 Vcc results, typically 3 Vcc−1 Vt which gates on transistor 134 through node CØ which is connected to node HØ. NAND gate 1400 is used to provide a shorter path for the low edge of clock signal 3002 so that clock signal 3006 goes low prior to clock signal 3010 going low to avoid coupling Vccp to GØ after GØ falls.

The result is a final voltage at node CØ which is higher than then the final voltage at node GØ. Transistor 134, having a source voltage of 2 Vcc (GØ) and a gate voltage of 3 Vcc−1 Vt (CØ), passes 2 Vcc to its drain as output Vccp. In practice the actual potential at Vccp may not reach 2 Vcc due to non-ideal devices, output loads, etc. Also, it may not be desired to have a full 2 Vcc level at Vccp, however passing the full charge from node GØ to Vccp provides greater efficiency especially during power up conditions when Vcc is not at its full potential.

The bottom portion 5002 of the FIG. 2 circuit is a mirror image of the top portion of the circuit and is functionally equivalent. The bottom portion of the circuit, however, receives clock signal 3004 which is 180 degrees out of phase with clock signal 3002. Together both portions of the circuit supply a continued booted voltage Vccp at the Vccp output terminal.

Typically a Vccp voltage regulator is used to control the oscillator 1100 such that the oscillator 1100 is shut off when Vccp is equal to or greater than a desired value. Allowing for additional voltage drops and circuit losses, exemplary values for voltages referred to herein are, Vcc=3 volts, Vccp=4.6 volts, and Vt=0.7 volts. It will be understood that different voltage levels could also be used.

Figure 3:
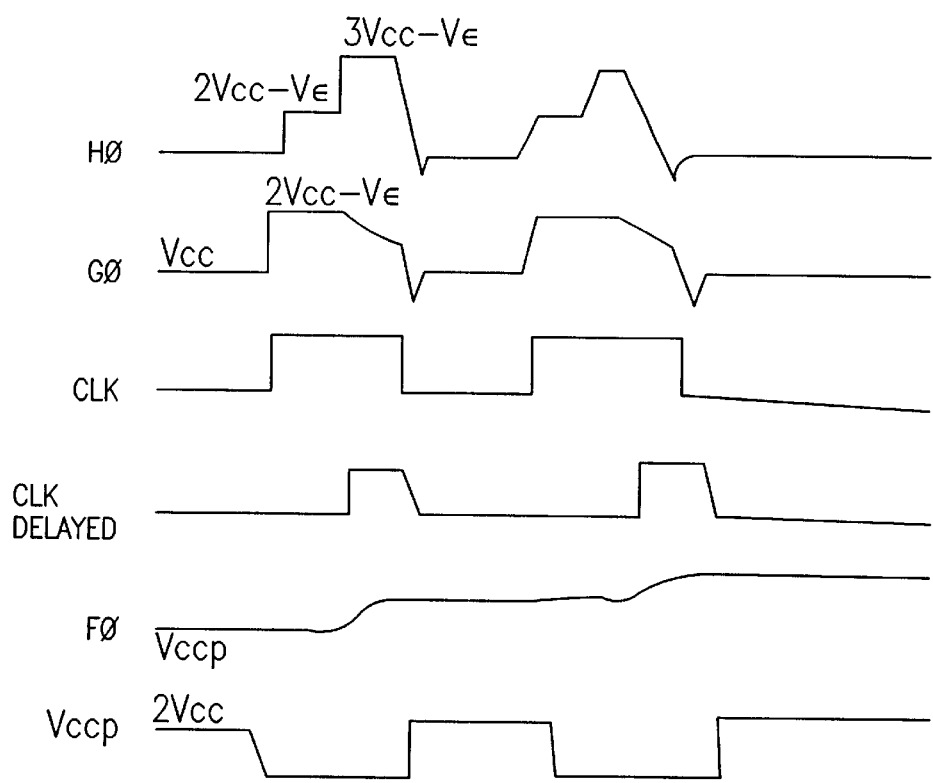
FIG. 3 is a graphical representation of voltages at various nodes of FIG. 2.

FIG. 3 illustrates various voltages at nodes depicted in FIG. 2. In particular the voltages at nodes GØ and HØ, in correlation with the clock, delayed clock, the Vccp voltage generated by one phase of the charge pump system 1000, and the total Vccp are displayed. A close study of FIG. 3 indicates that GØ pre-charges capacitor 1380 to Vcc, which is booted to 2 Vcc. Furthermore, HØ pre-charges capacitor 1480 to 2 Vcc−1 Vt, which is booted to 3 Vcc−1 Vt, thus driving the gate of output transistor 134.

Figures 4, 4A, 4B:
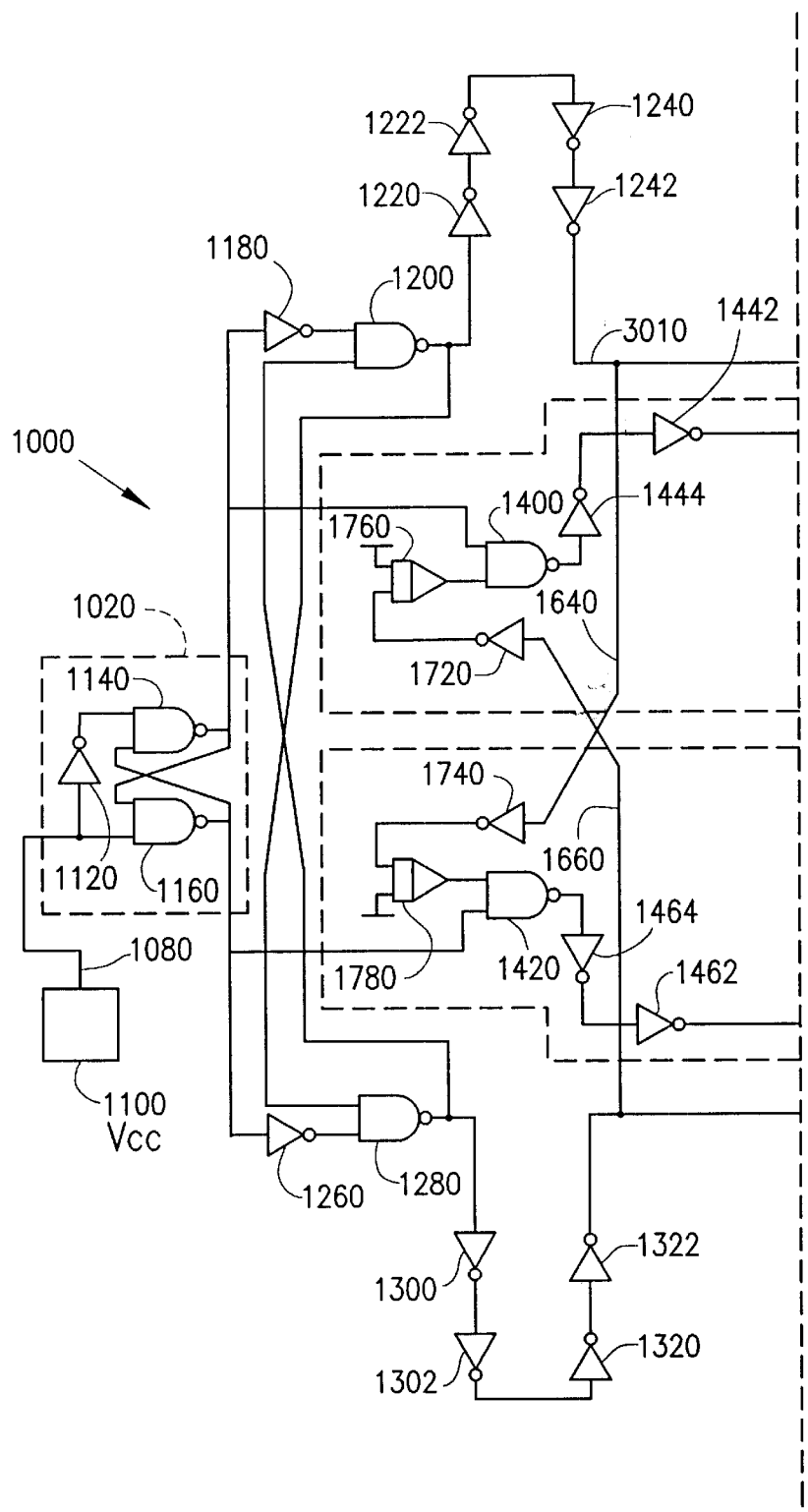
FIG. 4 is an illustration of an exemplary embodiment of the present invention.
Figure 4B:
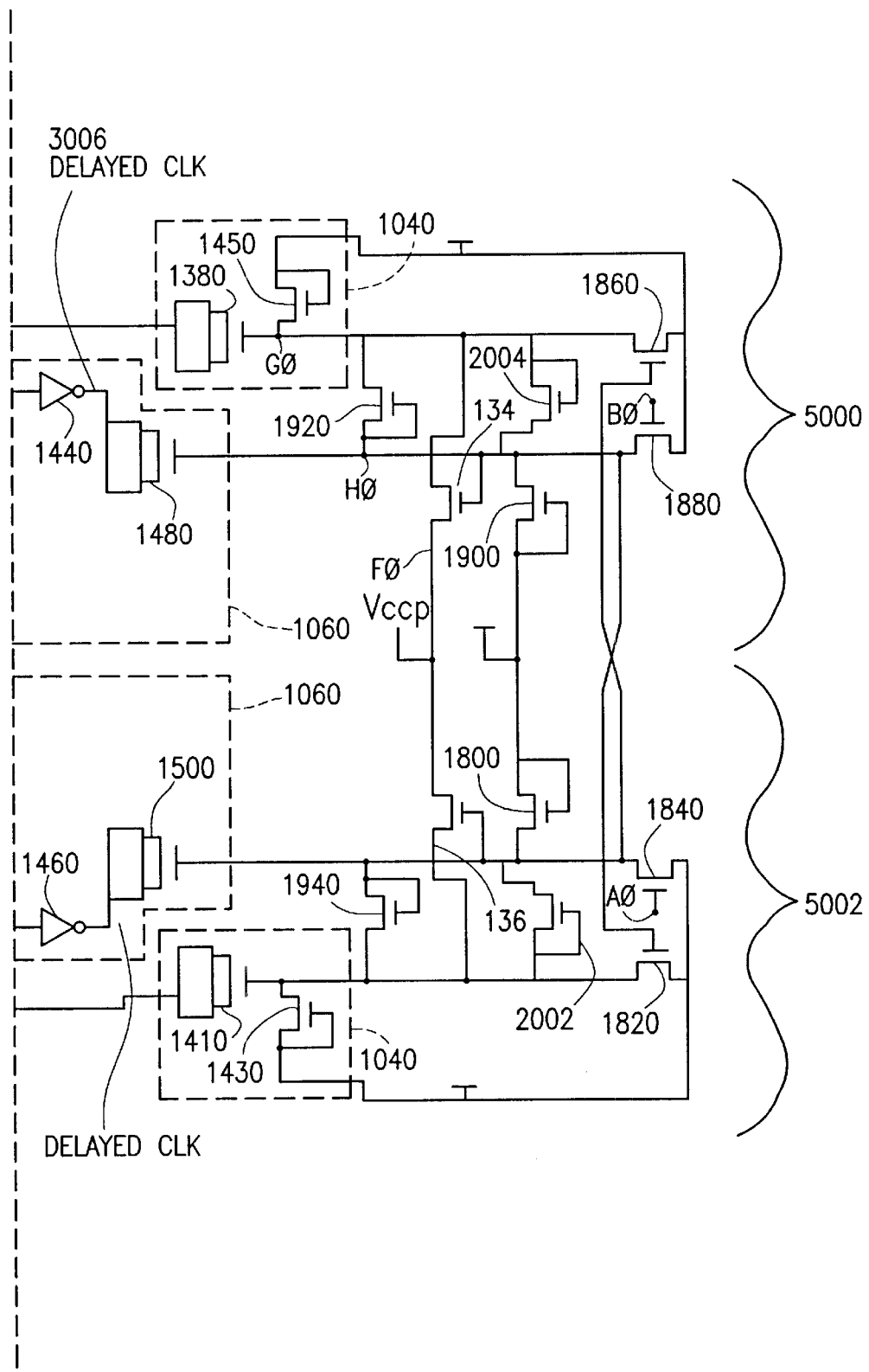
Figure 7:
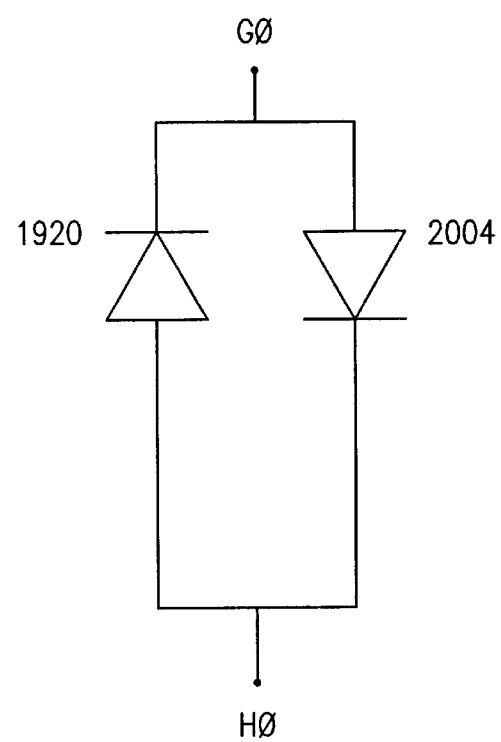
FIG. 7 is an illustration of an exemplary embodiment of the present invention with back to back diodes.

While the circuit of FIG. 2 works well, it is complex and consequently draws more current than is often desirable. The present invention simplifies the FIG. 2 circuitry. FIG. 4 illustrates an exemplary embodiment of the present invention. Using the top portion of the circuit 5000, for illustrative purposes, the charge pump system 1000 is modified with the addition of new diode 2004 and elimination of the pre-charge capacitor 1640 and the pre-charge circuitry associated with it. By use of diode 2004, the second boot circuit 1060 receives a pre-charge voltage at node HØ which is 2 Vcc−1 Vt. The 2 Vcc voltage is received from node GØ and is dropped by a single Vt when passing through diode 2004. The voltage 2 Vcc−1 Vt, is used to pre-charge capacitor 1480. Thus, when the clock signal at the input to capacitor 1480 goes high, the voltage at node HØ is now 3 Vcc−1 Vt, which is sufficient to drive the gate of transistor 134. New diode 2004 can also be placed in a configuration where it is back to back with diode 1920 as illustrated in FIG. 7.

Diode 2004 provides a voltage to node HØ of 2 Vcc−1 Vt which is greater than the initial voltage at node GØ by passing the final (booted) GØ voltage to node HØ. Thus, capacitor 1480 is pre-charged to the final GØ voltage (2 Vcc−1 Vt) resulting in a final (booted) output of 3 Vcc−1 Vt. Since 3 Vcc−1 Vt, the final voltage at node HØ, is greater than the 2 Vcc output of the first boot circuit 1040, the source voltage 2 Vcc at transistor 134 will be driven to Vccp output terminal as 2 Vcc. Therefore, the use of single diode 2004 obviates the need for the complex pre-charge circuitry of FIG. 2 to pre-charge capacitor 1480. Diode 1920 is still used to route excess charge from HØ to GØ and on through 134 to Vccp. This configuration of back to back diodes 1920 and 2004 provides very efficient control of nodes GØ and HØ.

Figure 5:
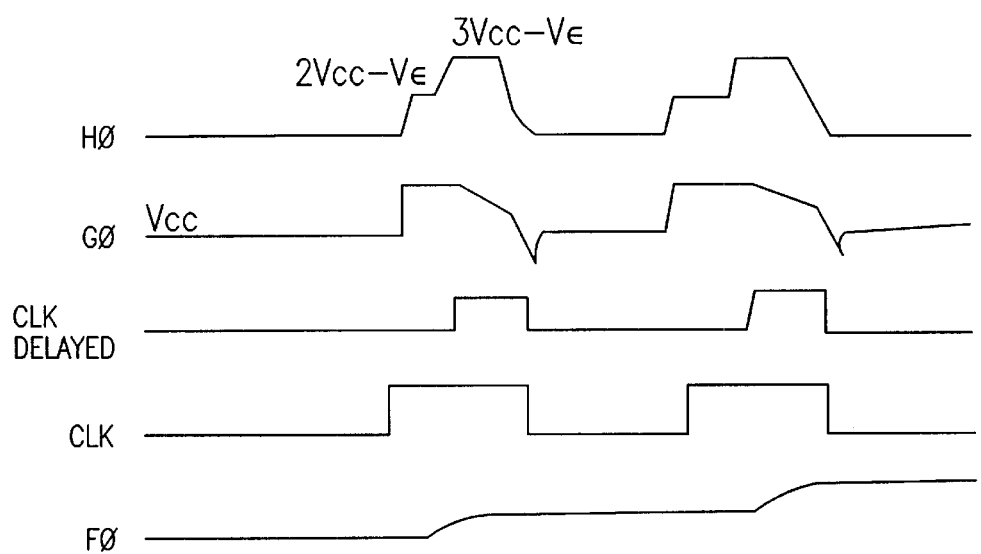
FIG. 5 is a graphical representation of the voltages at various nodes of FIG. 4.

This functionality can be verified by comparing the results of the circuit of FIG. 4 graphically depicted in FIG. 5 with that of FIG. 3. A close study of the rising edges of GØ (pre-charges capacitor 1380) and HØ (pre-charges capacitor 1480) in synchronization with the clock and clock delayed reveal this fact. Similar to FIG. 3, FIG. 5 shows that GØ pre-charges capacitor 1380 to Vcc which is booted to 2 Vcc. Furthermore, HØ pre-charges capacitor 1480 to 2 Vcc−1 Vt and which is booted to 3 Vcc−1 Vt, thus driving the gate of output transistor 134. In short, capacitors 1640 and 1660; transistors 1560, 1580, 1680 and 1700; and diodes 1600 and 1620 may all be eliminated from the FIG. 2 circuit in accordance with the invention. Single diode 2004 maintains nodes GØ and HØ at or near values of the prior charge pump system 1000. Therefore, the addition of a single diode drastically increases the hardware efficiency and decreases complexity of the charge pump system 1000, while lowering overall current drain.

The charge pump system 1000 may be fabricated of discrete components or as an integrated circuit. If fabricated as an integrated circuit, it may be fabricated along with the semiconductor circuit to which it supplies voltage on a substrate of a single die and contained in a single integrated package unit. The voltage pump system 1000 may also be fabricated by itself on a substrate of a die and then packaged for connection with and use with other circuit devices.

Figure 6:
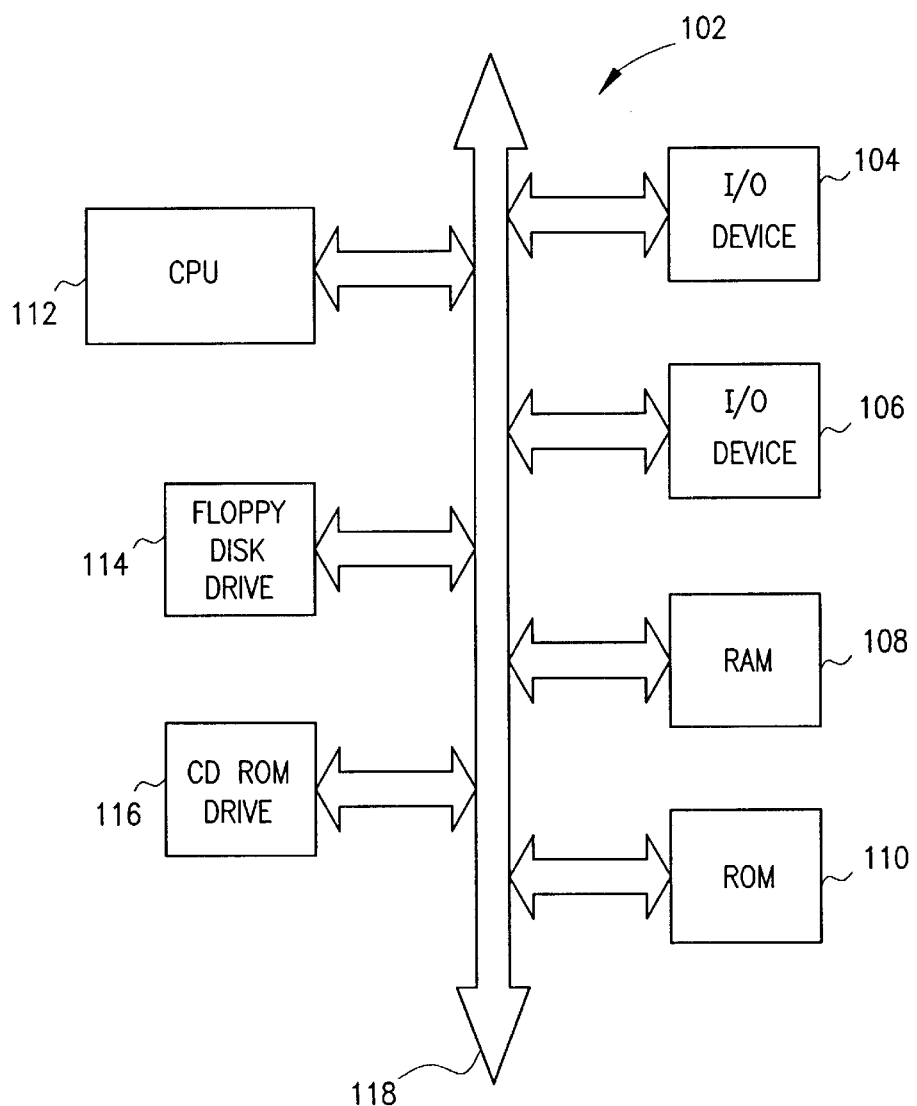
FIG. 6 illustrates a processor-based system employing the charge pump system of FIG. 4.

FIG. 6. illustrates a processor-based system 102, including central processing unit (CPU) 112, memory devices 108, 110, input/output (I/O) devices 104, 106, floppy disk drive 114 and CD ROM drive 116. All of the above components communicate with each other over bus 118. The central processing unit (CPU) 112, and one or more of the memory devices 108, 110 may use one or more charge pump systems 1000 for their respective operating voltages.

It is to be understood that the above description is intended to be illustrative and not restrictive. Many variations to the above-described system and method will be readily apparent to those having ordinary skill in the art. For example, the above system and method may be employed in multi-phase charge pumps or simply in a single stage charge pump.

Accordingly, the present invention is not to be considered as limited by the specifics of the particular structures which have been described and illustrated, but is only limited by the scope of the appended claims.

What is claimed as new and desired to be protected by Letters Patent of the United States is:

1. A charge pump comprising:
 a clock generator for supplying at least one clock signal; and
 at least one charge pump stage, each pump stage comprising,
  a first boot circuit for supplying a charge pump voltage, said first boot circuit having an input for accepting said at least one clock signal and a first output for providing an increased magnitude voltage;

an output transistor coupled between said output of said first boot circuit and an output terminal;

a second boot circuit controlling a gate of said output transistor, said second boot circuit having an input for accepting said at least one clock signal and an second output coupled to the gate of said output transistor, a pre-charge circuit for supplying a pre-charge voltage to said second boot circuit, said pre-charge circuit consisting essentially of a diode coupled between the output of said first boot circuit and the output of said second boot circuit, to permit current to flow from the output of the first boot circuit to the output of the second boot circuit.

2. The charge pump of claim 1, wherein said pre-charge voltage is supplied to a pump capacitor of said second boot circuit.

3. The charge pump of claim 2, wherein said second boot circuit does not include a pre-charge capacitor.

4. The charge pump of claim 1, wherein said first boot circuit further comprises:

a capacitor for storing a second pre-charge voltage when said at least one clock signal is low; and a unidirectional current device passing said second pre-charge voltage to said capacitor.

5. The charge pump of claim 1, wherein said diode is coupled between said first output and said second output.

6. The charge pump of claim 1, further comprising at least N of said pump stages having their output terminals connected to a common output terminal, said two pump stages being operated 360/N degree out of phase with respect to each other by said at least one clock signal.

7. The charge pump of claim 6, wherein N equals 2.

8. A processor system comprising:

a processor; and a memory device coupled to said processor, at least one of said memory device and said processor containing a charge pump system, said charge pump system comprising, a clock generator for supplying at least one clock signal; and at least one charge pump stage, each pump stage comprising, a first boot circuit for supplying a charge pump voltage, said first boot circuit having an input for accepting said at least one clock signal and a first output for providing an increased magnitude voltage;

an output transistor coupled between said output of said first boot circuit and an output terminal;

a second boot circuit controlling a gate of said output transistor, said second boot circuit having an input for accepting said at least one clock signal and an second output coupled to the gate of said output transistor, a pre-charge circuit for supplying a pre-charge voltage to said second boot circuit, said pre-charge circuit consisting essentially of a diode coupled between the output of said first boot circuit and the output of said second boot circuit, to permit current to flow from the output of the first boot circuit to the output of the second boot circuit.

9. The processor system of claim 8, wherein said pre-charge voltage is supplied to a pump capacitor of said second boot circuit.

10. The processor system of claim 9, wherein said second boot circuit does not include a pre-charge capacitor.

11. The processor system of claim 8, wherein said first boot circuit further comprises:

a capacitor for storing a second pre-charge voltage when said at least one clock signal is low; and a unidirectional current device passing said second pre-charge voltage to said capacitor.

12. The processor system of claim 8, wherein said diode is coupled between said first output and said second output.

13. The processor system of claim 8, further comprising at least N of said pump stages having their output terminals connected to a common output terminal, said two pump stages being operated 360/N degree out of phase with respect to each other by said at least one clock signal.

14. The processor system of claim 13, wherein N equals 2.

15. An integrated circuit comprising:

a die having a charge pump system fabricated thereon, said charge pump comprising, a clock generator for supplying at least one clock signal; and at least one charge pump stage, each pump stage comprising, a first boot circuit for supplying a charge pump voltage, said first boot circuit having an input for accepting said at least one clock signal and a first output for providing an increased magnitude voltage;

an output transistor coupled between said output of said first boot circuit and an output terminal;

a second boot circuit controlling a gate of said output transistor, said second boot circuit having an input for accepting said at least one clock signal and an second output coupled to the gate of said output transistor, a pre-charge circuit for supplying a pre-charge voltage to said second boot circuit, said pre-charge circuit consisting essentially of a diode coupled between the output of said first boot circuit and the output of said second boot circuit, to permit current to flow from the output of the first boot circuit to the output of the second boot circuit.

16. The processor system of claim 15, wherein said pre-charge voltage is supplied to a pump capacitor of said second boot circuit.

17. The processor system of claim 16, wherein said second boot circuit does not include a pre-charge capacitor.

18. The processor system of claim 15, wherein said first boot circuit further comprises:

a capacitor for storing a second pre-charge voltage when said at least one clock signal is low; and a unidirectional current device passing said second pre-charge voltage to said capacitor.

19. The processor system of claim 15, wherein said diode is coupled between said first output and said second output.

20. The processor system of claim 19, further comprising at least N of said pump stages having their output terminals connected to a common output terminal, said two pump stages being operated 360/N degree out of phase with respect to each other by said at least one clock signal.

21. A method of providing a charge pump voltage, said method comprising:

performing at least one voltage boosting process, each of said voltage boosting process comprising:

booting a first voltage to an second voltage greater in magnitude than said first voltage with a first boot circuit in response to a clock signal;

booting a third voltage to a fourth voltage greater in magnitude than said third voltage with a second boot circuit including a pump capacitor, in response to a clock signal;

gating said second voltage from said first boot circuit to an output terminal, wherein said gating is controlled by the second boot circuit; and pre-charging said pump capacitor by supplying a pre-charge voltage from said first boot circuit to said pump capacitor via a pre-charge circuit, said pre-charge circuit consisting essentially of a diode coupled between the output of said first boot circuit and the output of said second boot circuit, to permit current to flow from the output of the first boot circuit to the output of the second boot circuit.

22. The method of claim 21, further comprising:

supplying said first voltage as a pre-charge voltage to said first boot circuit through a unidirectional current device.

* * * * *